March 11, 1958     R. H. BRAUNLICH     2,826,067
PUMP TESTER
Filed Oct. 11, 1955
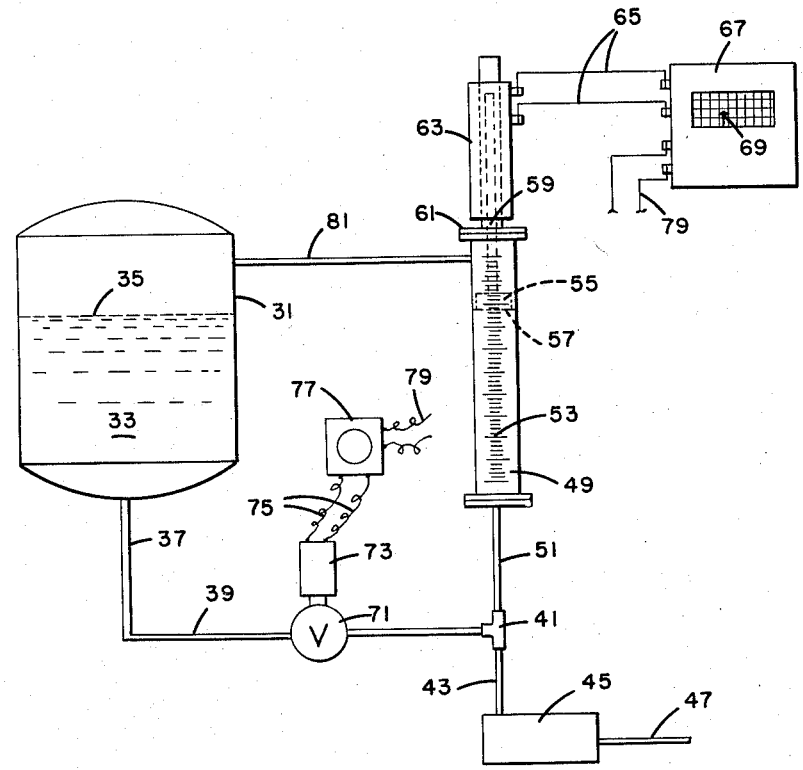

United States Patent Office 2,826,067
Patented Mar. 11, 1958

2,826,067
PUMP TESTER

Richard H. Braunlich, West Chester, Pa., assignor to American Viscose Corporation, Philadelphia, Pa., a corporation of Delaware Application October 11, 1955, Serial No. 539,819

1 Claim. (Cl. 73—168)

The invention relates to a pump testing apparatus, and particularly to an apparatus for metering the delivery flow of pulse type pumps.

In accordance with the conventional method of determining the flow rate of pulse type pumps, the fluid discharged from the pump is diverted from its customary path and collected in a suitable container for susbequent weighing. With the weight of the collected fluid and the time period of collection being known, the pump flow rate, in conventional units, can be easily determined. While this long-practiced method has been satisfactory for some purposes where accuracy is not an important or critical factor, the values obtained are often not indicative of the true pump capacity since the measurements are not based on the actual operating conditions of the pump, and thus factors, such as the pressure against which the pump must deliver the fluid, are not given due consideration. Further, this known procedure disrupts normal pump operation and is time consuming since the pump is usually stopped before and after each flow measurement to open and close the various valves necessary for diverting the fluid flow to and from the collecting container. In view of these disadvantages, it is therefore a primary object of the invention to provide a generally improved and more satisfactory apparatus for determining flow rates of pulse type pumps.

Another object of the invention is the provision of an apparatus for measuring the delivery rate of pulse type pumps under actual operating conditions and without disrupting normal pump operation.

Still another object is the provision of an indicator for use in fluid flow measurement which can be employed with new or existing equipment without altering its intended function, is simple in use, and provides accurate and reliable results.

A further object is to provide a fluid flow indicator which can be automatically operated at predetermined time intervals, records the flow rate at the particular instants, and sounds a warning system when the pump delivery rate falls below or exceeds a pre-set limit.

These and other objects and advantages of the invention will be apparent from the following description and accompanying drawing.

In general, the invention relates to an apparatus for use in determining fluid flow delivery rates of piston or pulse type pumps wherein a calibrated transparent tube or burette is connected in vertical position to the fluid supply conduit, intermediate the fluid supply source and the delivery pump. Under normal operating conditions, the fluid passes from the supply source to the pump and rises within the calibrated tube to substantially the same level as that of the supply source. Measurement of the pump delivery rate is accomplished by shutting off the fluid flow at a location between the supply source and the calibrated tube while the pump remains in continuous operation delivering the fluid contained between the pump and the shut off valve. By observing the time interval required for the fluid level or meniscus to pass between two well defined markings on the burette, the volume delivered per each pump stroke or per unit of time can be obtained. In lieu of the manual observation of the meniscus movement in the burette, a float having an armature movable within the magnetic field of induction coils may be employed. The induction coils are connected to a flow rate recorder and an automatically actuated valve for closing off the fluid supply at the predetermined intervals, and thus provides a permanent record of periodic flow measurements.

With reference to the structure shown, there is provided a supply tank 31 containing fluid 33 having an upper level indicated by the broken line 35. Conduits 37 and 39 connect the supply tank with the connector 41 from which fluid is passed through the conduit 43 to the piston type pump 45. The discharge conduit 47 connects the pump 45 with a suitable fluid receiving equipment, not shown. The upper end of the connector 41 is connected to the calibrated glass tube 49 through the conduit 51. The graduations 53 on the glass tube 49 are in volumetric units so that the volume displaced in relation to time can be readily observed.

To adapt the invention for automatic operation, a float 55 is placed on the upper level 57 of the fluid container within the glass tube 49 and has an armature 59 which is slidable vertically through a suitable opening in the non-metallic cover 61. One or more transmitting induction coils 63 surround the armature and when energized, provide a magnetic field through which the armature 53 is moved as the level of the fluid in the glass tube 49 varies. By means of electrical cables 65, the coils 63 are operatively connected to a conventional recorder 67 provided, for example with a floating pen 69 for recording the particular measurements.

Inserted in the conduit 39 is a valve 71, actuated at certain desired intervals by the solenoid 73 which in turn is connected by conductors 75 to a conventional timer unit 77. Conductors 79 interconnect the recorder 67 and timer 77 to maintain a proper sequence between the closure of the valve 71 and the operation of the recorder 67. A suitable pipe 81 is provided between the tank 31 and the glass tube 49 to equalize the pressure within these containers when pressure is utilized to force fluid from the tank 31.

In operation, energization of the solenoid 73 closes the valve 71 at a particular instant and is maintained closed for a pre-set period by the timer 77. The pump 45 remains in continuous operation and the operator can visually observe the time required for the float to fall between the various tube graduations 53, or the rate of descent of the float 55 may be automatically transmitted by the coils 63 to the recorder 67 as the armature 59 moves in the magnetic field of the coils. With this apparatus, measurements can be recorded automatically at regular intervals without any manual supervision, and with the elimination of any human error. If desired, the recorder may be combined with a warning system or with an automatic cut-off which would give notice of any variations in the pump delivery or stop the pump 45 when the delivery rate is below or exceeds a pre-set level.

It is seen from the above description that the objects of the invention are well fulfilled by the apparatus described. The description is intended to be illustrative only and it is to be understood that changes and variations may be made without departing from the spirit and scope of the invention as defined by the appended claim.

I claim:

Testing apparatus for use in determining the delivery rate of a pulse type pump including an elongated vertically disposed fluid receiving container, means at the lower end of said container for connecting the same in fluid communication with a fluid supply line intermediate a fluid supply source and a pump undergoing tests, a float disposed within said container and adapted to be buoyantly supported by the fluid received therein, valve means adapted to be interposed in a fluid supply line intermediate a fluid supply source and said container for obstructing fluid flow therethrough, means for operating said valve means at selected intervals, and electrical means including a recorder operated by the movement of siad float for recording the volumetric displacement of fluid by the pump undergoing tests as measured by the discharge of fluid from said container when said valve means is operated.

References Cited in the file of this patent

UNITED STATES PATENTS

| | | |
|---|---|---|
| 668,514 | Garrels et al. | Feb. 19, 1901 |
| 1,718,553 | Gauthier | June 25, 1929 |
| 2,062,173 | Haskins | Nov. 24, 1936 |
| 2,181,075 | Sherwood | Nov. 21, 1939 |
| 2,359,767 | Keinath | Oct. 10, 1944 |
| 2,409,982 | Longmate | Oct. 22, 1946 |
| 2,493,757 | Fish | Jan. 10, 1950 |
| 2,612,777 | Greer | Oct. 7, 1952 |